United States Patent

[11] 3,573,416

| [72] | Inventor | Guido Drechsler<br>Reutlingen, Germany |
|---|---|---|
| [21] | Appl. No. | 860,681 |
| [22] | Filed | Sept. 24, 1969 |
| [45] | Patented | Apr. 6, 1971 |
| [73] | Assignee | Dalmine SPA<br>Milan, Italy<br>fractional part interest |
| [32] | Priority | Sept. 28, 1968, Nov. 9, 1968, Nov. 16, 1968, May 21, 1969 |
| [33] | | Germany |
| [31] | | P 17 90 205.5, P 18 08 074.5, P 18 09 287.0, P 19 25 865.2 |

[54] METHOD AND DEVICE FOR SELF REGULATED WELDING IN THE MANUFACTURE OF LONGITUDINALLY WELDED METAL TUBES
12 Claims, 3 Drawing Figs.

[52] U.S. Cl. .................................................. 219/8.5,
219/59, 219/110, 219/131
[51] Int. Cl. ....................................................... B23k 13/02
[50] Field of Search ............................................. 219/85, 65,
59, 61, 110, 131, 135

[56] References Cited
UNITED STATES PATENTS
3,233,076  2/1966  Vilkas ........................... 219/131

Primary Examiner—J. V. Truhe
Assistant Examiner—J. G. Smith
Attorney—Kenyon and Kenyon, Reilly Carr & Chapin ABSTRACT: A method according to which the most important quantities in the manufacture of welded metal tubes, i.e. feeding speed of the metal band, upsetting pressure, intensity of the whole welding current, intensity of the so called back current, applied voltage and temperature of the welding seam, are continuously electrically measured and the measured values are correlated to each other obtaining a plurality of quotients which are compared with prefixed quotients corresponding to optimal welding conditions; the electrical value resulting from said comparison starts a self regulating process of the concerned quantities in order to reach again said prefixed quotients.

INVENTOR
GUIDO DRECHSLER.

INVENTOR
GUIDO DRECHSLER

METHOD AND DEVICE FOR SELF REGULATED WELDING IN THE MANUFACTURE OF LONGITUDINALLY WELDED METAL TUBES

BACKGROUND OF THE INVENTION

The present invention relates to a method and a device for improving the longitudinal welding of metal tubes, and in particular a method and a device for the continuous electrical measure of some important single quantities in the manufacture of welded tubes, such as the feeding speed of the metal band, upsetting pressure, the actual electrical power and the temperature of the welding seam, with consequent self regulation of said quantities in order to reach again optimal welding conditions.

In the prior art there are many regulating possibilities which are based on known conceptions. For example in each electrical welding process it is possible to regulate the necessary current amount as well as the feeding speed of the metal band to be welded. Also the upsetting pressure, the electrodes pressure and the position of the impedances in the HF welding process can be regulated at any moment.

However, up to now it is not yet known a welding system in which all the factors having a determinant importance in the manufacture of longitudinally welded tubes are simultaneously considered. A factor of great importance for all the electrical welding processes of tubes is the exact survey of the feeding speed of the metal band because the defective weldings are normally due to a not proper correlation between said feeding speed and the other aforesaid determinant quantities.

With a series of experiments and measures it has been found that the logic correlation of the quantities affecting the welding quality and their regulation can bring to clearly better welding results.

In particular, in the machines for the resistance butt welding it is to be duly considered that the whole current delivered to the welding equipment is subdivided in pure welding current and back current. With the term back current it is to be intended that part of the current which flows in the back portion of the tube opposite to the welding zone. The exact knowledge of said subdivision of the whole current is very important because the ratio of the pure welding current to the feeding speed of the band is determinant for the welding process. In the machines for the HF welding the ratio of the HF-energy to the feeding speed of the band has a very important role. Very important for the quality of the welding results is also the temperature of the welding seam. This quantity is determinant for the HF welding process, for the "Argonarc" process, for the resistance butt welding and for the "U.P." or submerged arc process.

The usual machines for the manufacture of welded tubes do not hold in due consideration the ratio of the electric welding power to the feeding speed of the band, nor the ratio of the electric welding power to the upsetting pressure, nor the contactless survey of the temperature of the welding seam. For this reason the machines of the prior art present a number of disadvantages which are due to the fact that the aforementioned determinant quantities are not measured and duly considered.

It is therefore a main object of the present invention to provide a self-regulated welding method which consent to manufacture welded tubes without one or more of the disadvantages encountered in operating according to the method of the prior art.

It is another object of the present invention to provide a device for the self-regulated welding of metal tubes without one or more of the inconveniences caused by the device of prior art.

Further objects and advantages of the present invention will be apparent to those skilled in the art from the followed detailed description with reference to the attached drawings wherein.

DISCLOSURE OF THE INVENTION

The method according to the present invention comprises essentially the steps of continuously measuring the basic quantities such as the feeding speed of the band, active electric welding power, upsetting pressure and temperature of the welding seam; electing one of such basic quantities as reference quantity; converting the measured values into electric signals; making ratios of the signals corresponding to each three basic quantities to the signal corresponding to the reference quantity for obtaining three quotient signals corresponding to the formed quotients; prefixing three limit signals for said quotients such as these give optimal welding results; making a comparison between each quotient signal and the respective prefixed limit signal for obtaining three difference signals; making the algebraic sum of the three difference signals for obtaining a sum signal; causing the sum signal to act on the said three basic quantities till the suppression of said three difference signals. The action of the sum signal on said three basic quantities starts a self-regulating process of said quantities such as to reestablish the optimal welding conditions established when prefixing said three limit signals.

Figure 1:
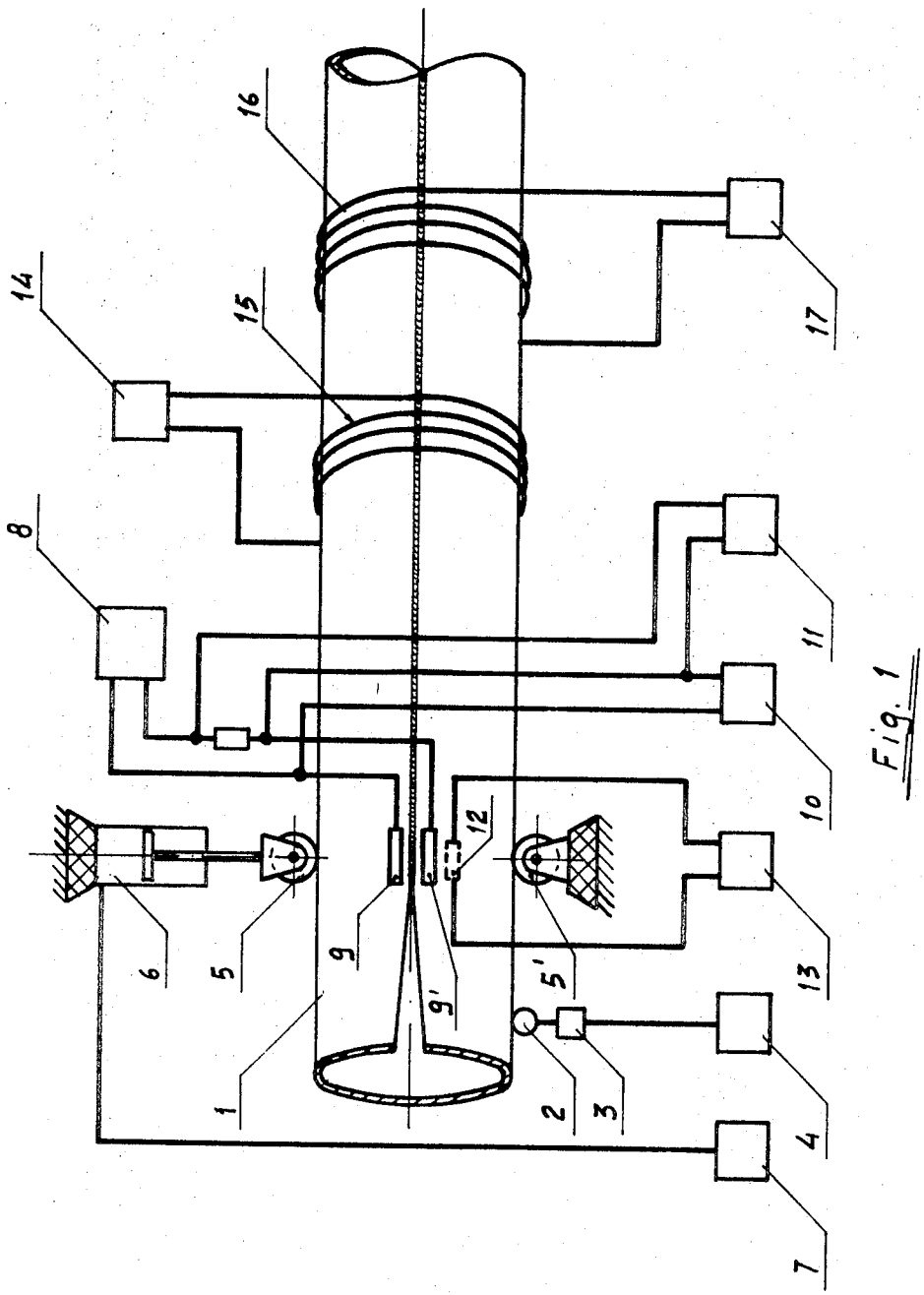
FIG. 1 shows a simplified top view of a tube welded according to the present invention and of the means for the continuous electrical measure of the important quantities in the manufacture of welded tubes.

Referring now to FIG. 1, which shows the tube 1 to be welded and the means for the measure of the basic quantities and their conversion into electric signals, the feeding speed of the band is measured by means of the measuring wheel 2 connected to the tacho-alternator 3 and to the transductor 4 which gives in output an electric signal corresponding to the feeding speed of the band. The upsetting pressure is measured by means of a known device 6 directly connected to the upsetting rolls 5 and 5'; the measured value is converted into an electric signal by the transductor 7 connected to the device 6. The whole current delivered by the feeder 8 to the welding electrodes 9 and 9' is measured by means of a suitable measuring member 11 which can comprise either an usual sensing element or a magnetic sensing element. The voltage applied to the welding electrodes is measured by means of a known device 10. The signal resulting from the multiplication of the output signals of the devices 10 and 11 corresponds to the whole power applied to the welding process.

In order to know the active welding power it is necessary to subtract the back power from the whole power. With the term back power is here designated that part of power which is dispersed as a consequence of the fact that part of the whole current, i.e. the back current, flows in the back portion of the tube opposite to the welding zone. According to a feature of the present invention the back current is measured by means of magnetic sensing elements connected to a transductor 13 which gives in output an electric signal corresponding to the value of the back current. The signal resulting from the multiplication of the output signals from 10 to 13 corresponds to the back power.

The temperature of the welding seam is measured in a point immediately downstream of the welding zone. According to a feature of the present invention said measure is effected by means of a novel arrangement which operates according to the following principle. An alternating magnetic field generated in a coil 15, which is water-refrigerated and supplied by power supply 14, originates eddy currents in that portion of the tube which has been just welded. Said eddy currents are limited by the temperature of the welding seam in such way that the short circuit effect in the closed tube crossed by the magnetic field, i.e. the induced magnetic field, acts on a secondary coil 16; this action being the stronger, the colder is the welding seam and the higher is then the intensity of the induced currents. Since the intensity of the induced currents is a function of the temperature of the welding seam, the transductor 17 connected to the secondary coil 16 gives directly an electric signal corresponding to the temperature of the welding seam.

Figure 2:
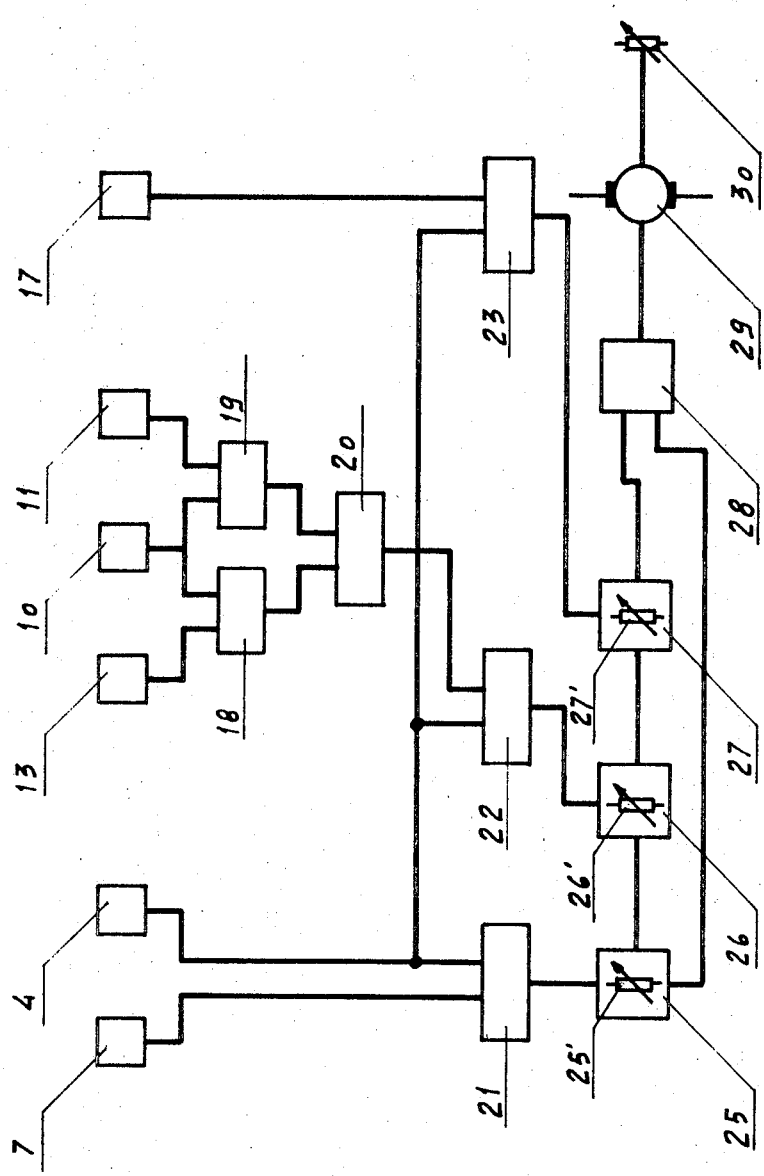
FIG. 2 shows a block diagram of an embodiment of the device for the practical execution of the method according to the present invention.

In FIG. 2 there is shown an embodiment of a complete device useful in the practical execution of the method according to the present invention. This complete device includes the components 4, 7, 10, 11, 13 and 17 which are similar to the components bearing the same reference numerals and already described above referring to FIG. 1.

The output signal of component 11, corresponding to the whole current, and the output signal of component 10, corresponding to the applied voltage, are delivered as input to the multiplier 19 the output of which is a signal corresponding to the whole power applied to the welding process. The output signal of component 13, corresponding to the back current, and the output signal of component 10 are delivered as input to the multiplier 18 the output of which is a signal corresponding to the back power. The output signals of both components 18 and 19 are delivered as input to a subtracting unit 20 which subtracts the back power from the whole power and gives an output signal corresponding to the active welding power.

The output signals of components 4 and 7, corresponding to the feeding speed of the band and to the upsetting pressure respectively, are delivered as input to a dividing unit 21 which gives an output signal corresponding to the ratio $P/V$, i.e. the ratio of the upsetting pressure to feeding speed of the band.

The output signal of component 4 is simultaneously delivered also to the dividing unit 22, connected to the component 20 and to the dividing unit 23 connected to the component 17. The output signal of the unit 22 corresponds to the ratio $Ne/V$ of the active welding power to feeding speed, while the output signal of the unit 23 corresponds to the ratio $T/V$ of the welding seam temperature to feeding speed.

As it can be seen, the illustrated device is an embodiment of the method according to the present invention, wherein as reference quantity is elected the speeding feed of the band. Although each of the aforementioned basic quantities may be elected as reference quantity, it is often preferable to elect as reference quantity the feeding speed of the band which is the most difficult to postregulate. It is known that said quantity is the most slow in responding to subsequent regulations.

The output signals of components 21, 22 and 23 are delivered as input to the comparators 25, 26 and 27 respectively. This comparators are provided with suitable means for the introduction of prefixed limit values for the ratios $P/V$, $Ne/V$ and $T/V$. Said limit values are prefixed such as to correspond to optimal welding conditions. The output signals of components 21, 22 and 23 are compared with said prefixed limit values in the comparators 25, 26 and 27 respectively. Said three comparators are connected in series to an adding unit 28 so that the output signals of the three comparators are algebraically summed in the unit 28 which gives as output a sum signal. This sum signal is amplified and then delivered to a regulator motor 29 directly acting on the member 30 which modifies the quantity to be regulated.

In a preferred embodiment of the device according to the present invention the components 25, 26 and 27 are each provided with a subsidiary regulating unit 25', 26' and 27', by means of which it is possible to enlarge or reduce, according to the percentual influence wanted the respective quantity to have in the regulation, the output signals of each said components. In this way the sum signals coming out from the adding unit 28 shall be more or less influenced by each of the three basic quantities according to the percentual importance given to each quantity by means of said subsidiary regulating units 25', 26' and 27'.

Figure 3:
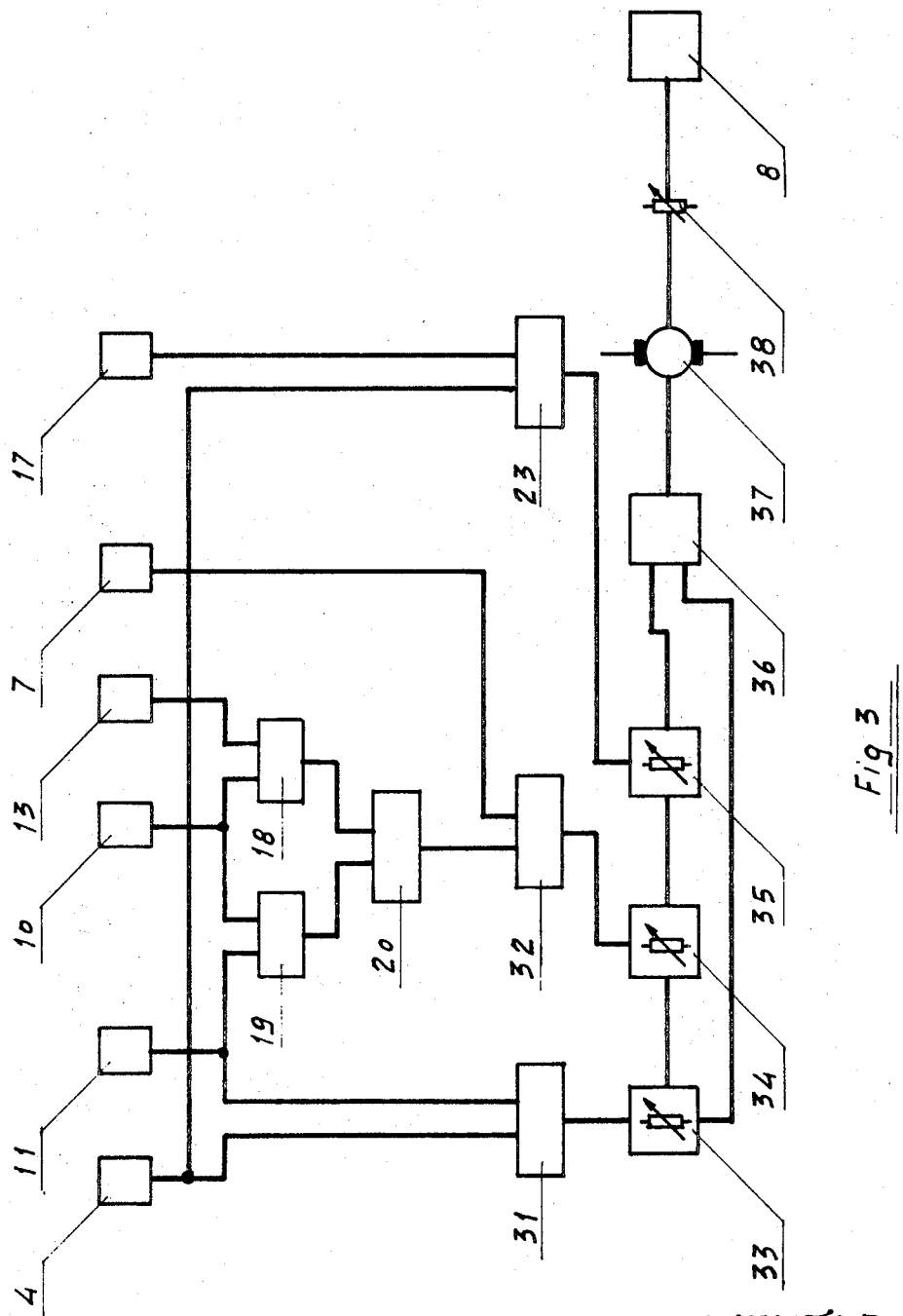
FIG. 3 shows a block diagram of a further embodiment of a device for the practical execution of a method according to the present invention.

With reference to FIG. 3, wherein for the same parts the same reference numerals of FIG. 1 and FIG. 2 are used, will be now described another embodiment of the method and device according to the present invention. In this embodiment the feeding speed of the band and the upsetting pressure are selected as reference quantities, while the sum signal coming out from the adding unit 36 modifies the current delivered by the feeder 8 until said sum signal is suppressed.

The device of FIG. 3 differs from the device of FIG. 2 because the connection of the components 4, 7, 11, 17 and 20 with the dividing units 23, 31 and 32 is arranged in a way that the output signals of this dividing units corresponds to the ratios $T/V$ of the seam temperature to feeding speed, $T/V$ of the intensity of the whole current to feeding speed, and $Ne/P$ of the active welding power to upsetting pressure respectively. The output signals of the units 31, 32 and 23 are delivered as input to the comparators 33, 34 and 35 respectively, which have a construction similar to that of the units 25, 26 and 27 of FIG. 2, and are connected in series to the adding unit 36.

The output signals of the comparators 33, 34 and 35, eventually after a preferential percentual modification of them, are delivered as input to the adding unit 36 where they are algebraically summed. The sum signal coming out from the unit 36 is amplified and then delivered to the regulator motor 37 acting on the variator 38 which modifies the current delivered by the feeder 8 until said sum signal is suppressed.

The single electric and electronic components of the devices illustrated in the attached drawings are well-known in the art so that a more detailed description of their construction can be omitted.

The method and the device according to the present invention can be advantageously employed in the manufacture of welded metal tubes with the "Argonarc" welding process, the resistance butt welding process and the HF welding process. The technological improvements of the present invention can be employed in some extent also in the so-called "U.P." welding process.

Although the invention has been described in considerable detail with reference to certain preferred embodiments thereof, it will be understood that variations and modifications can be effected within the spirit and scope of the invention as described above and as defined in the appended claims.

I claim:

1. A method of regulating welding in the manufacture of longitudinally welded metal tubes from a metal band comprising the steps of continuously measuring the basic quantities of feeding speed of the band, active electric welding power, upsetting pressure and temperature of the welding seam; electing one of said basic quantities as reference quantity; converting the measured values into electric signals; making ratios of the signals corresponding to each three basic quantities to the signal corresponding to said reference quantity for obtaining three quotient signals; prefixing three limit signals for said ratios such as these give optimal welding results; comparing each said quotient signals with the respective prefixed limit signal for obtaining three difference signals; making the algebraic sum of said difference signals for obtaining a sum signal; causing said sum signal to act on at least one of said three basic quantities until the suppression of said difference signals.

2. A method according to claim 1, wherein said sum signal is caused to act on the active electric welding power.

3. A method according to claim 1, wherein the temperature of the welding seam is measured by measuring the intensity of a secondary magnetic field induced by eddy currents generated by a primary magnetic field applied on the tube portion immediately downstream of the welding zone.

4. A method of regulating welding in the manufacture of longitudinally welded metal tubes from a metal band, comprising the steps of continuously measuring the values of feeding speed of the band, of the whole current delivered to the welding equipment, of the back current, of the voltage applied to the welding equipment, of the upsetting pressure and of the welding seam temperature; converting the measured values into electric signals; multiplying the signal corresponding to the applied voltage by the signal corresponding to the whole current and by the signal corresponding to the back current for obtaining a first product signal corresponding to the whole power and a second product signal corresponding to the back power respectively; subtracting said second product signal from said first product signal for obtaining a signal corresponding to the active welding power; making the ratio of the signal corresponding to the whole current to the signal corresponding to the feeding speed, the ratio of the signal corresponding to the active welding power to the signal corresponding to the upsetting pressure and the ratio of the signal corresponding to the welding seam temperature to the signal corresponding to the feeding speed for obtaining three quotient signals; prefixing for each said quotient signals a limit signal such as to give optimal welding results; comparing each said quotient signals with the respective limit signal such as to give optimal welding results; comparing each said quotient signals with the respective limit signal for obtaining three difference signals; making the algebraic sum of said difference signals for obtaining a sum signal; causing said sum signal to act on the whole current until the suppression of said difference signals.

5. A method according to claim 3, wherein the back current is measured by determining the value of a magnetic field in the back of the tube opposite to the welding zone.

6. A method according to claim 3, wherein the welding seam temperature is measured by measuring the intensity of a secondary magnetic field induces by eddy currents generated by a primary magnetic field applied on the tube portion immediately downstream of the welding zone.

7. A device for regulating welding in the manufacture of longitudinally welded metal tubes from a metal band, comprising four measuring units each for the continuous electrical measure of the basic quantities of feeding speed of the band, active electric welding power, upsetting pressure and temperature of the welding seam respectively; three dividing units each receiving as input the output signal of one of said measuring units, the output signal of the fourth of said measuring units being delivered as input to all said dividing units simultaneously; three comparators each connected to one of said dividing units and all connected in series to an adding unit, the input of each of said comparators being formed by the output signal of the connected dividing device and by a limit signal manually introducible in each comparator; a regulating unit which receives the sum signal coming out from said adding unit and adapted to act on the feeder of one of said basic quantities until the output signals of said comparators are suppressed.

8. A device according to claim 7, wherein said unit measuring the active welding power comprises a subtracting unit which subtracts the signal corresponding to the back power from the signal corresponding to the whole power applied to the welding equipment, said signals being the output signals of two multipliers which multiply the applied voltage by the whole current or by the back current respectively, said back current being measured by means of a unit responsive to a magnetic field applied on the tube zone opposite to the welding zone.

9. A device according to claim 7, wherein said unit measuring the temperature of the welding seam comprises an excitation winding connected to a suitable power supply and coiled around the tube to be welded inducing therein eddy currents, and a secondary winding connected to a transductor the output of which is a signal corresponding to the seam temperature.

10. A device according to claim 7, wherein said measuring unit delivering its output signal to all said dividing units simultaneously is the unit measuring the feeding speed of the band.

11. A device according to claim 7, wherein said regulating device receiving the sum signal coming out from said adding unit acts on the power supply.

12. A device for regulating welding in the manufacture of longitudinally welded metal tubes from a metal band, comprising six measuring units each for the continuous electrical measure of the basic quantities of feeding speed of the band, whole current, back current, voltage applied to the welding equipment, upsetting pressure and temperature of the welding seam respectively; a first multiplier which receives as input the output signals of the units measuring the whole current and the applied voltage respectively, the output signal of said first multiplier corresponding to the whole electric power applied to the welding equipment; a second multiplier which receives an input the output signals of the units measuring the back current and the applied voltage respectively, the output signal of said second multiplier corresponding to the back power; a subtracting unit which receives as input the output signals of said first and second multiplier and the output of which is a signal corresponding to the active welding power; a first dividing unit which receives as input the output signals of the units measuring the whole current and the feeding speed respectively, the output signal of said first dividing unit corresponding to the quotient of these two basic quantities; a second dividing unit which receives as input the output signals of said subtracting unit and of unit measuring the upsetting pressure, the output signal of said second dividing unit corresponding to the quotient of the active welding power to the upsetting pressure; a third dividing unit which receives as input the output signals of the units measuring the welding seam temperature and the feeding speed respectively, the output signal of said third dividing unit corresponding to the quotient of these two basic quantities; three comparators each connected to one of said dividing units and all connected in series to an adding unit, the input of each said comparators being the output signal of the dividing units connected thereto and by a limit signal manually introducible in each comparator; a regulating unit which receives as input the sum signal coming out from said adding unit and is adapted to act on the whole current.

UNITED STATES PATENT OFFICE
CERTIFICATE OF CORRECTION

Patent No. 3,573,416          Dated May 26, 1971

Inventor(s) Guido Dreschsler

It is certified that error appears in the above-identified paten and that said Letters Patent are hereby corrected as shown below:

Col. 4, line 13 (second occurrence) "T/V" should be -- I/V -- ;

Col. 5, lines 17-19, "comparing each said quotient signals with the respective limit signal such as to give optimal welding results;" should be cancelled;

Col. 5, line 30, "induces" should be -- induced -- .

Signed and sealed this 24th day of August 1971.

(SEAL)
Attest:

EDWARD M. FLETCHER, JR.
Attesting Officer

WILLIAM E. SCHUYLER, JR.
Commissioner of Patents